Dec. 22, 1936.  R. K. THULMAN  2,065,481
HEATING SYSTEM
Filed Dec. 18, 1934  6 Sheets-Sheet 1

Fig.1.

INVENTOR.
ROBERT K. THULMAN
BY John E. Hubbell
ATTORNEY

Patented Dec. 22, 1936

2,065,481

UNITED STATES PATENT OFFICE 2,065,481

HEATING SYSTEM

Robert K. Thulman, Larchmont, N. Y., assignor to Lawler Automatic Controls, Mount Vernon, N. Y., a corporation of New York Application December 18, 1934, Serial No. 758,007

8 Claims. (Cl. 237—8)

The general object of the present invention is the provision in a hot water heating system of novel and effective means for supplying water to the radiator, radiators, or other heating elements or devices of the system, at a temperature varying with the need for heat and normally lower than the water temperature in the water heater of the system, so that the last mentioned temperature may be maintained constant or approximately constant.

The maintenance of a constant or approximately constant and suitably high water temperature in the water heater permits the latter to serve as an indirect heater for water for uses of the character commonly designated by the term "domestic use", the water for such uses being drawn through a pipe coil or like heating device immersed in the body of water within the heater and forming the heating medium of the hot water heating system.

Heretofore, in the operation of a hot water heating system in which an approximately constant water temperature is maintained in the water heater or boiler, it has been customary to pass water, with no significant loss of temperature, from the heater into the radiators or other heating devices intermittently, and to regulate the heat output or heating effect of those devices by varying the relative duration of the periods during which the devices do and do not receive water from the heater. Such intermittent operation of the heating system is not conducive to good regulation, and tends to inefficient operation of the water heater or boiler, and is undesirable for other reasons.

The present invention is charaterized by the means provided for making the water passed into the heating devices a mixture of relatively hot water supplied by the water heater or boiler and colder water received from the return piping of the system. Said means comprise a pipe connected between the supply and return piping of the system and forming a by-pass about the heater, and mixing valve means for regulating the relative amounts of water passing from the heater outlet and from the by-pass connection into the supply piping and thence to the heating devices.

The present invention relates to hot water heating apparatus and the general object of the invention is to provide a system of the character specified, characterized by the simple and effective provisions employed for varying the room heating effect produced in accordance with the water heater or boiler of the heating system.

In simple prior hot water heating systems in which an approximately constant water temperature is maintained in the water heater or boiler, the amount of heat furnished by the radiators is customarily varied in accordance with the need for heat by provisions which make the flow of the heating medium into the radiators intermittent, the medium being passed into the radiators during periods which vary in length or frequency, or both, with the need for heat. Except when the need for heat is much greater than normal, the operation of the system is thus highly intermittent, and its intermittent character increases the difficulty of obtaining proper regulation and tends to inefficient operation of the water heater or boiler.

The present invention is characterized by its inclusion of simple and effective provisions whereby the water circulated through the hot water radiators or heat exchange elements is a mixture of water returned from the radiators or elements and passed through the heater or boiler with water returned from the radiators or elements and not passed through the heater or boiler. As a result of this mixture, the water passed through the radiators or heat exchange elements will normally be at a temperature below the heater or boiler water temperature. The reduction in the temperature of the water passed into the heating elements permits the circulation of the water therethrough to be continuous in some cases, and in other cases it permits the average duration of the periods during which water is passed through the radiators to be materially prolonged and thus eliminates or minimizes objections due to intermittent operation. By increasing and decreasing the amount of water passing to the heating devices through the by-pass relative to the amount of water passing to them from the heater outlet, the temperature of the water passing to the heating devices may be varied to regulate the heat output of the heating devices, and except in the extreme case in which all the water passing to the heating devices comes from the heater, the water temperature in the supply piping will be significantly below the water temperature in the heater or boiler. The reduction in the temperature at which water is supplied to the heating devices reduces the heat output of the latter, so that for the desired heating effect the water may be passed through the devices continuously or, in any event, during a greater portion of the time than when all the water passing to the heating devices at any time is water passing directly from the water heater.

In general, the amount of heat required for room heating purposes increases and decreases as the outside air temperature decreases and increases, and the present invention is characterized in particular by the provisions whereby the ratio of the amount of water passing to the radiators from the heater and from the by-pass, respectively, is automatically varied in accordance with the outside temperature.

The means employed to regulate the above mentioned ratio in accordance with the present invention include thermostatic means responsive to the outside temperature, in combination with other control means, the character of which may vary with the character of the heating system proper. With a simple hot water heating system of the gravity circulation type, use is advantageously made of a mixing valve including thermostatic provisions responsive to the external temperature and thermostatic provisions responsive to the temperature of the water mixture formed and tending to maintain a water mixture temperature which, while constant for any one outside air temperature, increases and decreases as the outside air temperature decreases and increases respectively.

In a hot water heating system including a circulating pump employed to move water through the heating system at an average rate which may be varied by intermittent operation of the pump to thereby increase and decrease the average heating effect of the radiators or other heating devices, the mixing valve need not include thermostatic means responsive to the mixture temperature, but may be a proportioning valve which will vary the ratio of the amounts of water passing to the heating devices from the heater and from the by-pass, respectively, in predetermined correspondence with the adjustment of the valve effected by the thermostatic means responsive to the outside air temperature. Whether the mixing valve above mentioned is of one or the other type, it preferably includes adjustment provisions by which the mixture ratio and temperature may be varied manually, or in automatic response to some condition other than the outside air temperature.

The present invention may advantageously be used, not only in simple hot water heating systems in which the heating devices are ordinary hot water heating system radiators located in the room or rooms to be heated, but in systems of different types. In particular, the invention may be used in combined heating and ventilating systems in which a heating device through which the hot water mixture is passed, is the air heater or heat exchanger employed in so-called indirect heating systems including ventilating fan means for circulating air through a room or rooms to be thereby ventilated and heated and for passing the air over the heat exchanger employed to heat the air. The use of the present invention is of a special utility and value in the last mentioned case when, as is customary, the operation of the ventilating fan is made dependent on the operation of the air heating means, and is interrupted when the water circulation in the air heating heat exchanger is interrupted. In such case, a reduction in the temperature of the water passing through the heat exchanger or air heater permitting the latter to operate continuously or during a greater portion of the time than when the water temperature is higher, correspondingly increases the portion of the time during which the ventilating fan is in operation, and thereby improves the ventilation and enhances the value of air conditioning provisions such as air filters and humidifying means which may be and customarily are included in combined air heating and ventilating systems.

The water heater employed in the practice of the present invention may be of any usual or suitable form employed in ordinary hot water heating systems, and in some cases may even be a boiler generating steam for steam heating or other uses, in which case the boiler is provided with a water outlet and a water inlet, each opening to the water space of the boiler below the water level therein and connected to the supply and return piping respectively between which one or more hot water radiators or heat exchangers are connected.

The various features of novelty which characterize the present invention are pointed out particularly in the claims annexed to and forming a part of this specification. For a better understanding of the invention, however, its advantages and specific objects attained with its use, reference should be had to the accompanying drawings and descriptive matter in which I have illustrated and described preferred embodiments of the invention.

Figure 1:
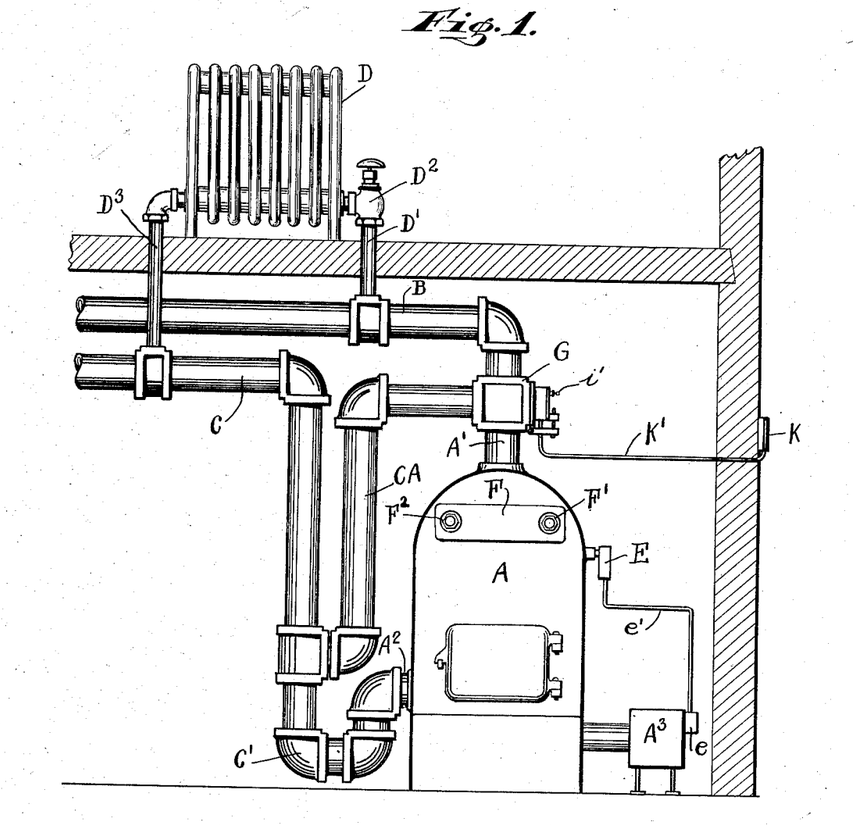
Fig. 1 is a diagrammatic representation of a portion of a hot water heating system.

The simple hot water heating system shown in Fig. 1 is of the gravity circulation type and comprises a water heater A delivering hot water through an upper outlet A' to a radiator supply pipe B and receiving water at a lower inlet $A^2$ from the return pipe C of the hot water heating system, the pipe C including a trap loop C' adjacent and at a lower level than the heater inlet $A^2$. One of the radiators D forming a part of the heating system is shown in Fig. 1, and has its inlet connected through a pipe D' and a throttling and cut off valve $D^2$ to the supply pipe B, and has its outlet connected by a pipe $D^3$ to the return line C. Other radiators of the system, not shown in Fig. 1, may be connected similarly between the supply and return pipes B and C. As conventionally illustrated, a burner $A^3$ supplies heat to the heater A at a rate depending on the adjustment of a regulating device $e$. The latter is automatically adjusted through an operating connection $e'$ by a thermostatic controller E, responsive to the water temperature in the heater. The controller E may be of the commercial type known as an "aqua-stat", which adjusts the burner $A^3$ as required, to maintain the heater water temperature approximately constant.

Within the water space of the heater A is a water heating coil F having an inlet F' receiving water to be heated from many suitable source of water under pressure, ordinarily a water supply pipe or main, and delivering heated water through its outlet $F^2$ leading to place or places of use of the water heated. For the most usual domestic service the outlet $F^2$ is connected to the valved inlets of sinks, wash basins and bath tubs directly, or through a hot water storage tank, not shown, but which may be connected in a well known manner to the inlet F' and outlet F² for recirculation of water through the coil F and the storage tank.

Insofar as above described, the apparatus shown in Fig. 1 is a typical example of a hot water heating system in which the water heater A serves as a direct heater for the heating system, and as an indirect heater for water heated for domestic use, or other purposes than for use in the hot water heating system.

For the purposes of the present invention, a pipe CA is connected between the return pipe C and the supply pipe B of the hot water heating system of Fig. 1 and forms a by-pass about the heater A, and a thermostatic valve G is employed to automatically regulate the relative amounts of water passing into the supply pipe B from the heater through its outlet A', and from the return pipe C through the recirculating connection CA. Where as shown in Fig. 1, the water circulation in the heating system is a gravity circulation, the pipe CA may have one end connected to the return pipe C at a level several feet below that at which the other end of the pipe CA is connected to the pipe B.

Figure 2:
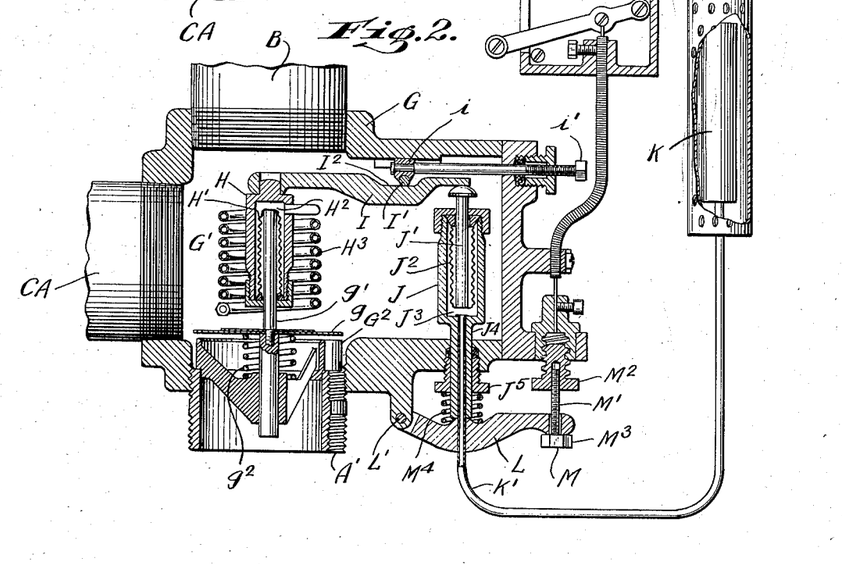
Fig. 2 is a sectional elevation of a mixture control valve employed in Fig. 1.

In the particular arrangement shown in Fig. 1, and in greater detail in Fig. 2, the casing of the valve G encloses a mixing chamber G' with an inlet at its bottom to which the heater outlet A' is connected, an outlet at its top to which the heating system supply pipe B is connected, and a lateral inlet to which the upper end of the recirculating connection CA is connected. Flow into the chamber G' through the heater outlet A' is controlled by a valve member $g$ movable downward toward and upward away from a position in which it engages a ported valve seat G² and prevents flow in to the chamber G' through the heater outlet A'.

In accordance with the present invention mechanism is provided for adjusting the valve $g$ to diminish, cut off, or increase the flow of water into the valve through the heater outlet A', as required to maintain a temperature in the chamber G', and hence in the supply pipe B, varying with the heat requirements of the heating system, while permitting a substantially constant water temperature to be maintained in the heater A of 180°–200° F. or so which is suitable for the operation of the coil F in heating for domestic or analogous uses.

In the form shown in Fig. 2, the valve member $g$ is a thin metal disc and is mounted on a valve operating member or stem $g'$ which extends through the valve disc $g$ and is attached to the latter and has its end at the inlet side of the valve slidingly received in a guideway or passage formed in a spider portion of the valve seat member G². The other end of the valve stem $g'$ is connected to thermostatic means responsive to the water temperature in the chamber G'. Said thermostatic means comprises a casing member H suspended from a supporting member I and enclosing a bellows element H'. The end of the latter adjacent to valve disc $g$ is attached to the casing member H. The opposite end of the bellows member H' is closed and in engagement with the corresponding end of the valve stem $g'$. The bellows element H' forms a movable wall for a chamber space H² within the casing member H and external to the bellows H' which contains a fluid suitably increasing and diminishing in pressure as its temperature rises and falls. To increase the quantity of that fluid and to minimize differences between its temperature and that of the water in the chamber G', use may be made of a pipe or tube H³ coiled about the casing element H and connected to chamber H² and in effect forming an extension of that chamber. The tendency of the variable pressure in the chamber H² to hold the valve $g$ against the seat member G² is opposed by a spring $g^2$ acting between the member G² and the valve $g$.

When the water temperature in the chamber G' rises above that which the apparatus is adjusted to maintain, the consequent increase in temperature and pressure of the fluid in the chamber space H² contacts the bellows H' and gives a closing adjustment to the valve member $g$, thereby throttling the inlet of hot water from the heater A to the chamber G' and reducing the temperature in the chamber G'. Conversely when the temperature in the chamber G' falls below the temperature which the apparatus is adjusted to maintain, the temperature and pressure of the fluid in the chamber space H² diminish and the bellows H' elongates, thereby giving the valve member $g$ an opening adjustment and increasing the amount of hot water passing from the heater A into the chamber G', and raising the water temperature in the latter.

In the apparatus shown in Fig. 1, the temperature desirably maintained in the mixing chamber G' will vary with the temperature to be maintained in the space heated by the heating system radiators, and with the amount of heat which those radiators must radiate to maintain the last mentioned temperatures. For example, it is frequently desirable to maintain a night time temperature in a living room appreciably lower than the temperature maintained in the day time, and whatever the room temperature maintained may be, the heat required for its maintenance will increase and decrease, in general, as the outdoor temperature decreases and increases.

In the embodiment of the invention illustrated in Figs. 1 and 2, provisions are made for the manual adjustment of the thermostatic means included in the valve G so that the temperature in the chamber G' maintained with any given outdoor temperature may be regulated, and for the automatic adjustment of said means so that the temperature maintained in the chamber G' will change in suitable accordance with changes in the outside temperature. In the form of apparatus shown in Fig. 2, the temperature maintained in the chamber G' may be adjusted by movement of the support I to vary the distance of the thermostatic casing element H from the valve seat G². To this end, the member I is in the form of a lever adapted to turn about a fulcrum I' suitably supported in the chamber G'. The spring $g^2$ acting through the casing H, on one end of the lever I tends to turn the latter in one direction, and a a plunger J' engaging the other end of the lever tends to turn the latter in the opposite direction. The plunger J' forms the movable element of a thermostatic device J of the fluid pressure type and including a casing and a bellows J² within the casing.

As shown the plunger J' has its end remote from the lever I secured to the corresponding and movable end of the bellows element J², which is located within and has its stationary end anchored to the casing member of the device J. The bellows element J² forms the movable wall of a fluid pressure chamber J³. As shown, the casing of the device has a tubular extension J⁴ at its end opposite to that from which the plunger J' protrudes, which passes through and may be axially adjusted in the wall of the casing G. A pipe K' extending through the tubular extension J⁴ connects the chamber space J³ to a bulb or container K for a thermally expansible fluid, the bulb being exposed to the temperature of the outside air. In consequence as the external temperature and the pressure of the fluid in the bulb K, pipe K' and chamber J³ increase and diminish, the bellows element J² tends to contract and elongate. The expansion of the bellows J² on a decrease in outside air temperature moves the plunger J' in the direction to increase the distance between the member H and the valve seat G² and thereby increases the temperature in the chamber G' which the apparatus tends to maintain. Conversely the movement of the plunger J' occurring when an increase in the outside air temperature results in a contraction of the bellows J², diminishes the distance between the casing member H and the valve seat G², and lowers the temperature which the apparatus tends to maintain in the member G'.

The previously mentioned manual adjustment of the plunger J', and thereby of the lever I and casing element H, is effected by axial adjustment of the casing extension J⁴ in its passageway through the wall of the valve casing G. To this end, in the construction shown, the outer end of the extension J⁴ is in engagement with a lever L having one end pivotally connected at L' to the valve casing G, and means are provided for angularly adjusting the lever L. The adjusting means shown comprises a tension member M having a screw portion M' threaded into a nut portion M² of the casing G, and having a head portion M³ bearing against the free end of the lever L, and holding it against movement away from the casing G. The lever L is held against the head portion M³ by a spring M⁴ acting between the lever L and a stuffing box member J⁵ surrounding the extension J⁴.

The range of change in the water temperature within the chamber G', produced by a given range of change in outside air temperature may be varied by adjusting the fulcrum I' longitudinally of the lever I. As shown the fulcrum I' is in the form of a bearing pin engaging a straight edge portion I² of the lever I, and carried by a support i mounted for sliding movement in the chamber G', and given such movement by the rotation of an operating screw i' threaded in and extending through an aperture in the wall of the casing G.

Figure 4:
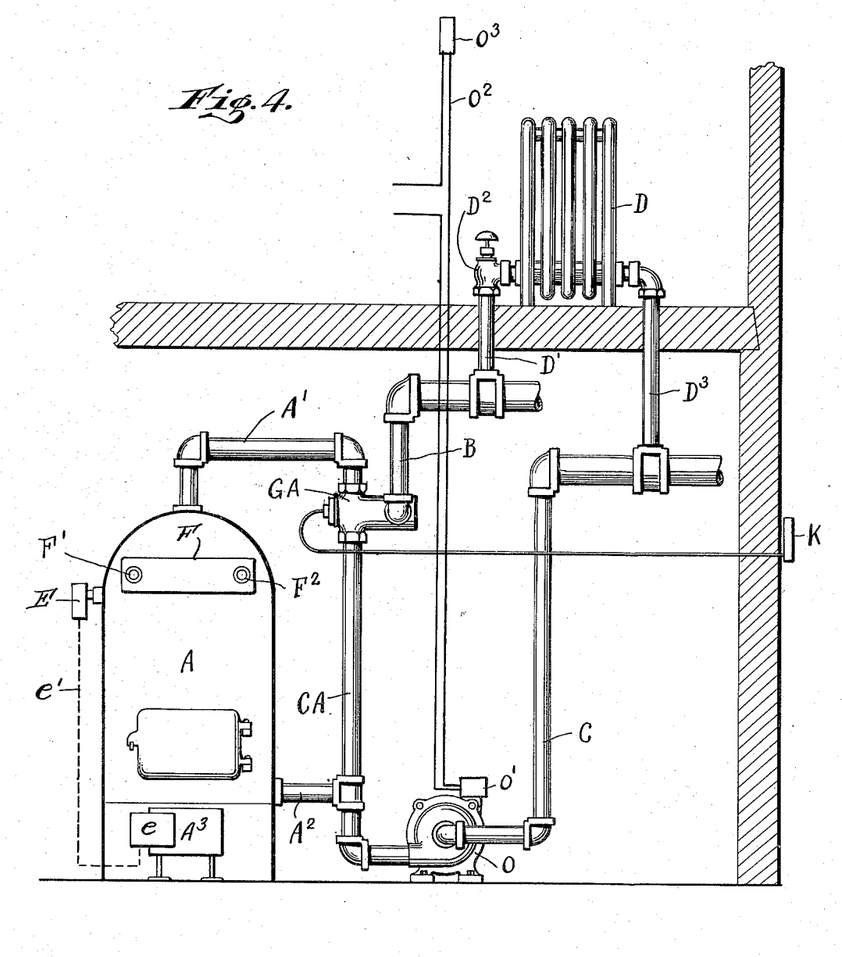
Fig. 4 is a diagrammatic representation of a portion of a hot water heating system differing from that shown in Fig. 1.

The system shown in Fig. 4 differs from that shown in Fig. 1 in that it includes a water circulating pump O. As shown the pump O receives water from the return line C and delivers water to the heater inlet A² and the by-pass pipe CA. In Figure 4, therefore, the water circulation through the radiators depends upon the operation of the pump O. As diagrammatically illustrated, the pump is started and stopped by a pump controller O' which might be manually controlled, but as diagrammatically shown, is automatically adjusted through a control circuit or other connection O² by a so-called "room thermostat" O³ responsive to the temperature of the space heated by the radiator D.

Figure 3:
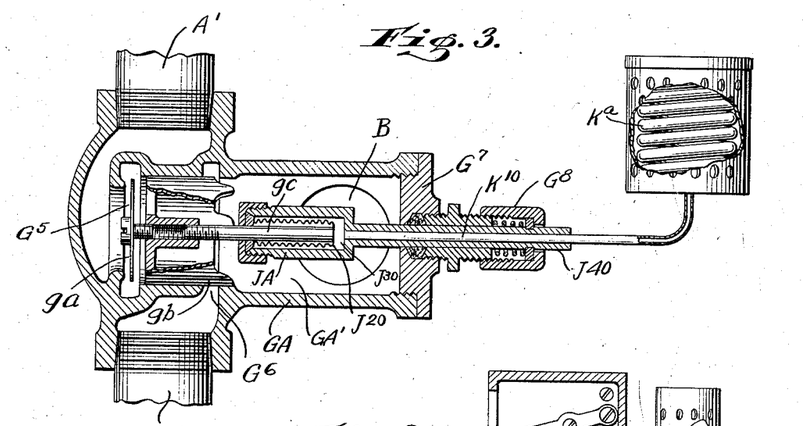
Fig. 3 is a sectional elevation of a different form of mixing valve.

In the system shown in Fig. 4, the temperature at which water is passed to the supply pipe B may be controlled by a valve exactly like the valve G of Figs. 1 and 2. Preferably, however, in a system in which a circulating pump is employed and the flow resistance of the mixing or regulating valve is relatively unimportant, the valve used omits the thermostatic means responsive to the temperature of the water mixture formed, employed in Fig. 2, and is a proportioning valve exerting inverse throttling or flow restricting effects on the flow into the valve and thence into the supply pipe B from the heater outlet A' and from the by-pass pipe CA to thereby increase and decrease the temperature of the water passing through the supply pipe B as the outside temperature respectively decreases and increases. The valve GA, as shown in Fig. 3 comprises a mixing chamber GA' with an outlet to the supply pipe B and receives water from the heater outlet A' through a port G⁵ controlled by a disc valve ga and receives water from the by-pass pipe CA through an annular port G⁶ controlled by a sleeve valve member gb which is co-axial with the ports G⁵ and G⁶. The disc valve ga and the sleeve valve gb are both attached to a valve stem member gc. The end of the latter remote from the disc valve ga is connected to the movable end of the bellows J² of a thermostatic device JA. The latter may be identical in construction and operation with the device J shown in Fig. 2, and has its chamber J³⁰ connected by a pipe K¹⁰ to a bulb or expansible fluid container KA exposed to the outside air temperature. As shown in Fig. 3, the extension J⁴⁰ of the casing of the device JA is axially adjustable in a passage formed for the purpose in the valve casing head member G⁷, and may be secured in any desired adjustment by means of a clamping screw G⁸.

In the operation of the apparatus of Figs. 3 and 4, a decrease in the outside air temperature results in a movement of the valve disc ga, away from the port G⁵, and increases the area for flow through that port, and at the same time the sleeve valve gb is moved to decrease the area for flow through the port G⁶. On an increase in the outside air temperature, the valve members gr and gb are moved in the reverse direction to decrease the area for flow through the port G⁵ and to increase the area for flow through the port G⁶. In consequence, an increase or decrease in the outside temperature respectively decreases or increases the temperature of the water passing to the radiator or radiators through the supply pipe B. The volume of the circulation increases and decreases as the speed of the pump O is increased and decreased. In consequence of the variations in the rate of circulation and in the temperature of the water circulated, occurring as the need for heat varies, it is possible to maintain a continuous circulation of water from the radiators with the proper radiator heat output, under conditions in which the heat output required varies widely.

Figure 5:
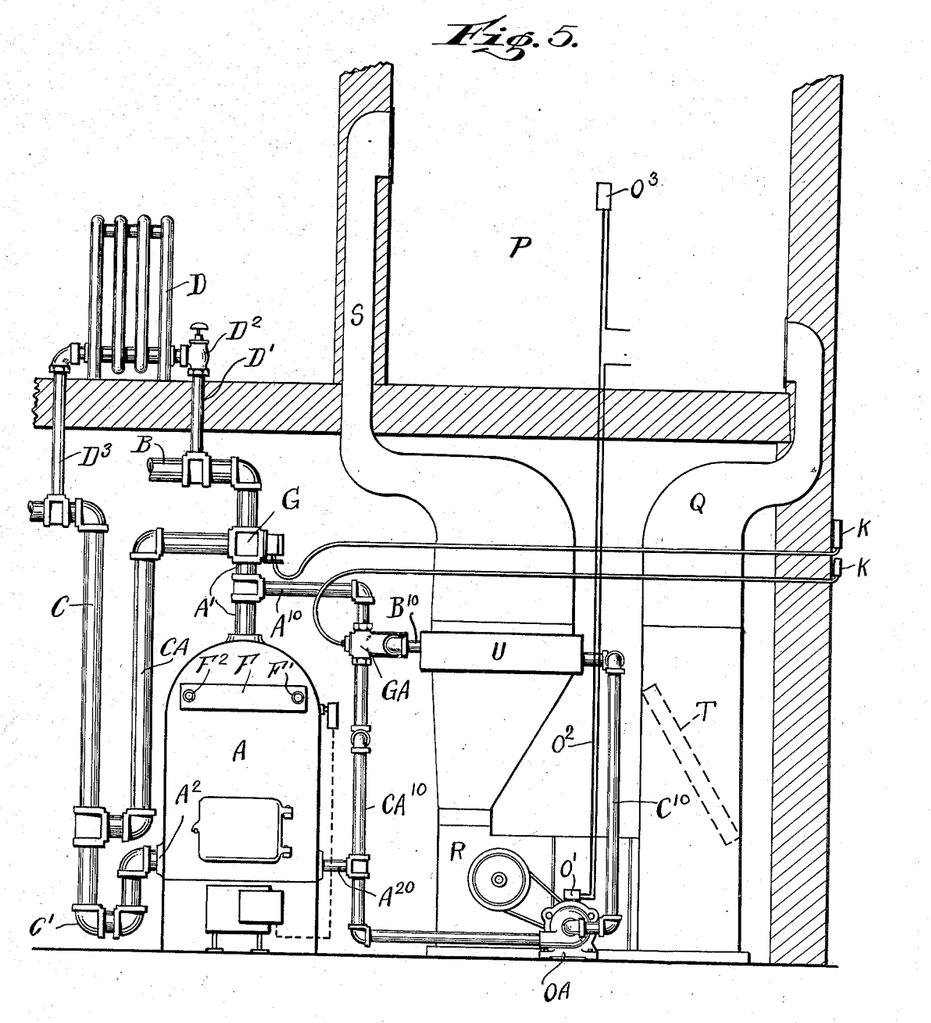
Fig. 5 is a diagrammatic representation of apparatus comprising a water heater supplying water to radiators as in Fig. 1, and also supplying water to a heat exchanger forming a part of a combined air heating and ventilating system.

Figure 5 illustrates a combined heating and ventilating apparatus comprising one or more room heating radiators D associated with a water heater A to form a hot water heating system of the type shown in Fig. 1, and also comprising means associated with the heater A in accordance with the present invention, for heating the air used in heating and ventilating a room space P separate from the rooms heated by the radiators D. The ventilating system shown in Fig. 5 comprises an air duct Q through which air is drawn from the room space P by a ventilating fan R which returns air to the room space P through a duct S. The fan R is driven by the same motor employed to drive a water circulating pump OA, and may be controlled through a controller O' and connection O² by a room thermostat O³ responsive to the temperature in the space P, as the speed of the pump O of Fig. 4 is controlled. As shown, the ventilating system of Fig. 5 includes two air conditioning elements, one an air filter T in the duct Q, and the other a heat exchanger U in the duct S.

As shown in Fig. 5, the heat exchanger U forms the heating device of and in effect replaces the radiator D of a hot water heating system of the kind shown in Fig. 4. The parts $A^{10}$, $A^{20}$, $B^{10}$, $C^{10}$, OA, $CA^{10}$, and GA of Fig. 5 correspond respectively, to the parts A', $A^2$, B, C, O, CA, and GA of Fig. 4. In respect to its hot water heating features, the apparatus of Fig. 5 may be regarded as comprising two hot water heating systems which are separate and independent from one another, except that each includes the same hot water heater which has one outlet A' and inlet $A^2$ for one heating system, and has another outlet $A^{10}$ and inlet $A^{20}$ for the other heating system.

The use of apparatus of the general character illustrated in Fig. 5 is especially advantageous when, as is frequently the case in modernizing old dwelling houses, it is desirable to both heat and ventilate some rooms in the house, while supplying heat only to other rooms. In such case, it is usually practically important to keep the amount and cost of the apparatus required relatively small, and to this end it is desirable to use a single motor to operate the ventilating fan R and the pump OA for circulating water through the air heater U, and to modify the motor operation in accordance with the air heating effect required. By modifying the temperature of the water supplied to the air heater for air heating purposes in accordance with the present invention and thereby increasing the portion of the time in which the motor is in operation, the time during which the ventilating fan is in operation is correspondingly increased.

Figure 6:
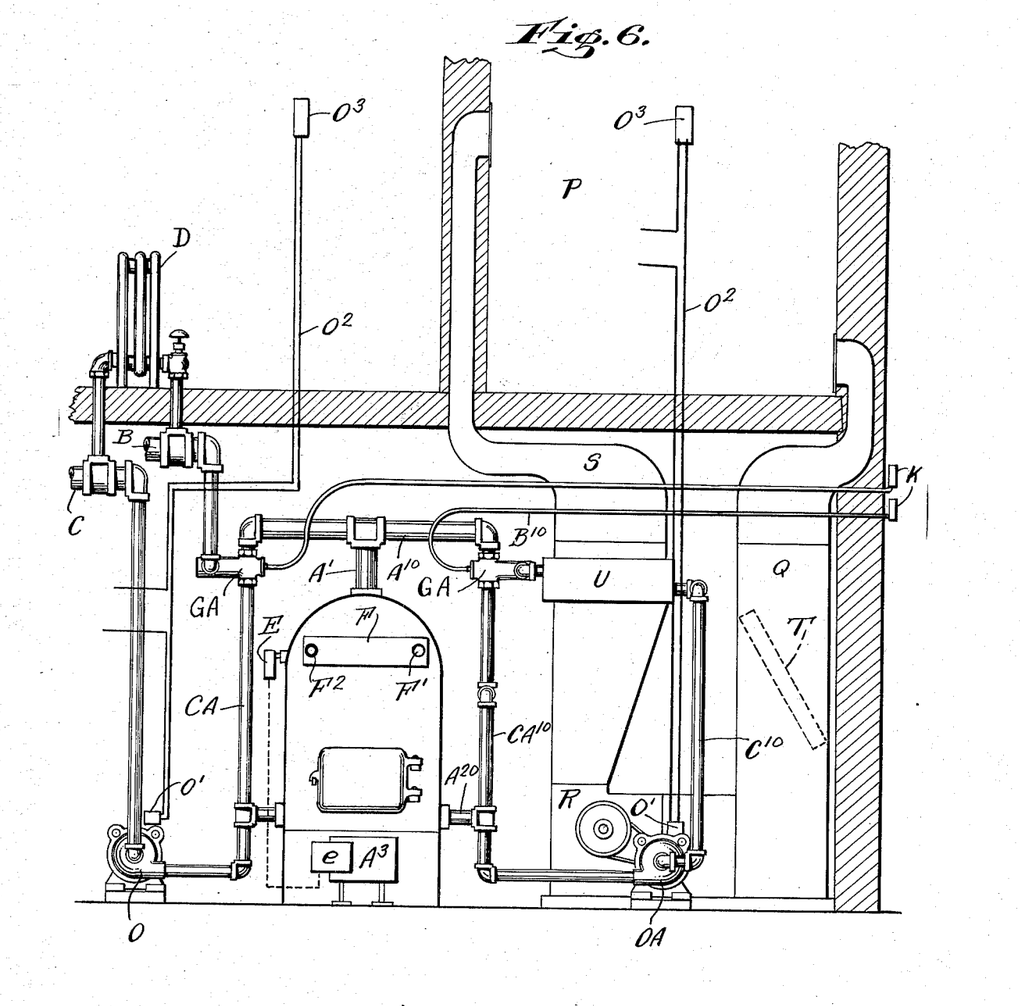
Fig. 6 is a diagrammatic representation of apparatus similar in general type to, but differing in some respects from the apparatus shown in Fig. 5.

The form of the invention illustrated in Fig. 6 differs from that illustrated in Fig. 5 only in that the portion of the apparatus forming the heating system including one or more radiators D, is of the type shown in Fig. 4, and not of the type shown in Fig. 1, as is the case in Fig. 5.

Figure 7:
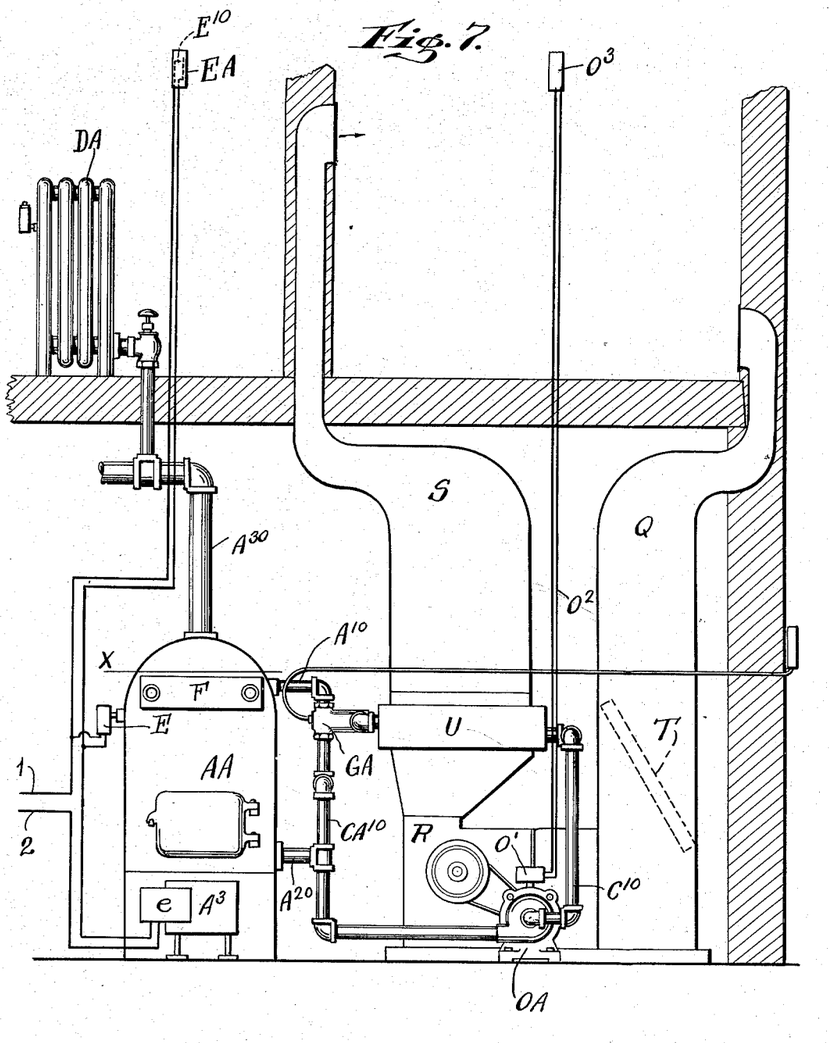
Fig. 7 is a diagrammatic representation of apparatus including air heating and ventilating apparatus receiving hot water for air heating from a boiler supplying steam for steam heating use.

The form of the invention illustrated in Fig. 7 comprises air heating and ventilating apparatus differing from that shown in Figs. 5 and 6 only in that the water heater AA of Fig. 7 is a boiler or steam generator, which has a water outlet $A^{10}$ and a water inlet $A^{20}$ connected into a hot water circulating system including a heat exchanger U as in Figs. 5 and 6. In Fig. 7 the water outlet $A^{10}$, as well as the water inlet $A^{20}$, is below the normal water level X in the boiler. As shown in Fig. 7, the boiler AA is provided with a steam delivery pipe $A^{30}$ constituting the supply pipe of an ordinary one-pipe steam heating system including one or more steam heating radiators DA. Within the water space of the boiler AA is a device F for heating water for domestic use as in each of the water heaters A of Figs. 1, 4, 5, and 6.

In a single pipe steam heating system it is ordinarily desirable to operate with a boiler steam pressure and temperature slightly higher when the required heat output of the radiators is relatively large than when a smaller radiator heating effect is required. Such variation in the boiler steam temperature and pressure is obtainable with the apparatus diagrammatically shown in Fig. 7 through the action of a room thermostat EA connected to the regulating device e and adjusting the boiler heating burner $A^3$ to increase the heat supply to the boiler whenever the temperature of the room heated by the radiator DA falls below a predetermined value. As shown in Fig. 7 the control due to the room thermostat EA supplements that due to the aqua-stat E which actuates the device e and burner $A^3$ as required to normally maintain a water temperature in the boiler not less than that required for the proper operation of the water heater F.

As diagrammatically shown in Fig. 7, the room thermostat EA comprises a thermostatic switch $E^{10}$ which closes when the room temperature falls below a predetermined value. On the closure of the switch $E^{10}$ an energizing circuit connection for the device e is closed between energizing supply conductors 1 and 2. The aqua-stat E of Fig. 7 is connected to the device e in parallel with the room thermostat EA, so that the device e will be energized for the actuation of the burner $A^3$ whenever its actuation is required to prevent either the room temperature to which the thermostat EA responds or the water temperature to which the aqua-stat E responds, from falling below their respective predetermined minimum values. As those skilled in the art will understand, the increase in the boiler steam pressure and temperature required for the intended control effect due to the room thermostat EA, is relatively small, and need not be large enough to significantly effect the temperature of the water heated by the heater F, or the temperature of the water passing through the air heating heat exchanger U.

While in accordance with the provisions of the statute, I have illustrated and described the best forms of my invention now known to me, it will be apparent to those skilled in the art that changes may be made in the form of the apparatus disclosed without departing from the spirit of the invention as set forth in the appended claims, and that some features of the invention may sometimes be used to advantage without a corresponding use of other features.

Having now described my invention, what I claim as new and desire to secure by Letters Patent is:—

1. In a hot water heating system, the combination of a water heater having an upper water outlet and a lower water inlet, a heating device, a supply connection leading from said outlet to said device, a return connection leading from said device to said inlet and in free communication therewith under all operating conditions, a by-pass connection between said return and supply connections forming a by-pass about the heater, means adjustable to vary the relative resistances to flow from the return connection to the supply connection through the flow paths formed by the heater and by-pass connection, respectively, and thereby divert more or less water passing from the device through the return connection away from the heater and into the supply connection through said by-pass connection, said means including means responsive to the outside air temperature for increasing and decreasing the resistance to flow to the supply connection through the path formed by the heater relative to the resistance to flow through the path formed by the by-pass, as said temperature increases and decreases.

2. In a hot water heating system of the gravity circulation type, the combination with a water heater having an upper water outlet and a lower water inlet, a heating device located at a higher level than the heater, a supply conduit connection between said outlet and said device, a return conduit connection between said device and inlet, a conduit connection between portions of said supply and return connections respectively adjacent said outlet and inlet forming a by-pass about said heater having small and constant flow resistance and uniting with said supply and return connections and said heating device to form a closed water circulation path independent of the heater, and means for variably restricting communication between the heater and said path to thereby vary the relative amounts of water passing to the supply connection from the heater through its outlet, and from the return connection through said by-pass.

3. Heating and ventilating apparatus comprising a ventilating fan and a heat exchanger for heating the air moved by said fan, a water heater, a supply connection for the passage of water from said heater to said heat exchanger, a return connection for the passage of water from said heat exchanger to said heater said return connection being in free communication with the heater under all operating conditions, a connection between the first mentioned connections forming a by-pass about the heater, means for varying the relative resistances to flow from the return connection through the flow paths formed by the heater and by-pass connection, respectively, thereby varying the relative amounts of water passing from the heater and from the by-pass to the heat exchanger, a circulating pump for moving water through said heat exchanger by-pass and heater, and common operating means for said fan and pump adjustable to vary the pump operation and thereby increase and decrease the air heating effect of the heat exchanger.

4. Heating and ventilating apparatus comprising a ventilating fan and a heat exchanger for heating the air moved by said fan, a water heater, a supply connection for the passage of water from said heater to said heat exchanger, a return connection for the passage of water from said heat exchanger to said heater said return connection being in free communication with the heater under all operating conditions, a connection between the first mentioned connections forming a by-pass about the heater, means responsive to the outside air temperature for varying the relative resistances to flow from the return connection through the flow paths formed by the heater and by-pass connection, respectively, thereby varying the relative amounts of water passing from the heater and from the by-pass to the heat exchanger to increase and decrease the temperature of the water passing to the heat exchanger as said outside air temperature decreases and increases, respectively, a circulating pump for moving water through said heat exchanger by-pass and heater, and common operating means for said fan and pump adjustable to vary the pump operation and thereby increase and decrease the air heating effect of the heat exchanger.

5. Apparatus for heating and ventilating a space comprising a ventilating fan for circulating air through said space and a heat exchanger for heating the air circulated by said fan, a water heater, a supply connection for the passage of water from said heater to said heat exchanger, a return connection for the passage of water from said heat exchanger to said heater said return connection being in free communication with the heater under all operating condition, a connection between the first mentioned connections forming a by-pass about the heater means for varying the relative resistances to flow from the return connection through the flow paths formed by the heater and by-pass connection, respectively, thereby varying the relative amounts of water passing from the heater and from the by-pass to the heat exchanger, a circulating pump for moving water through said heat exchanger by-pass and heater, and means for operating said fan and pump during more or less of the time as the temperature in said space decreases and increases, respectively.

6. A hot water heating system as specified in claim 2, in which the said means for variably restricting communication between said heater and said path comprises a valve and thermostatic operating means therefor responsive to the outside air temperature and adjusting said valve to increase or decrease its throttling effect as the outside air temperature respectively increases or decreases.

7. In a hot water heating system, the combination of a water heater having an upper water outlet and a lower water inlet, a heating device, a supply connection leading from said outlet to said device, a return connection leading from said device to said inlet and in free communication therewith under all operating conditions, a by-pass connection between said return and supply connections forming a by-pass about the heater, means adjustable to vary the relative resistances to flow from the return connection to the supply connection through the flow paths formed by the heater and by-pass connection, respectively, and thereby divert more or less water passing from the device through the return connection away from the heater and into the supply connection through said by-pass connection, said means including thermostatic means jointly responsive to the temperature of the water passing to the return connection and to the temperature of the outside air and adapted to increase the resistance to flow to the return connection through the path formed by the by-pass on an increase in either of said temperatures.

8. In a hot water heating system, the combination of a water heater having an upper water outlet and a lower water inlet, a heating device, a supply connection leading from said outlet to said device, a return connection leading from said device to said inlet and in free communication therewith under all operating conditions, a by-pass connection between said return and supply connections forming a by-pass about the heater, means adjustable to vary the relative resistances to flow from the return connection to the supply connection through the flow paths formed by the heater and by-pass connection, respectively, and thereby divert more or less water passing from the device through the return connection away from the heater and into the supply connection through said by-pass connection, and means including a circulating pump for increasing and decreasing the water flow through said heating device in automatic accordance with variations in the heating effect of the latter, the first mentioned means including means responsive to the outside temperature for increasing and decreasing the resistance to flow to the supply connection through the path formed by the heater, relative to the resistance to flow through the path formed by the by-pass, as said temperature increases and decreases, respectively.

ROBERT K. THULMAN.